United States Patent
Itsuji

(10) Patent No.: US 7,906,764 B2
(45) Date of Patent: Mar. 15, 2011

(54) MEASURING APPARATUS USING TERAHERTZ WAVE

(75) Inventor: Takeaki Itsuji, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/642,427

(22) Filed: Dec. 18, 2009

(65) Prior Publication Data

US 2010/0187420 A1 Jul. 29, 2010

(30) Foreign Application Priority Data

Jan. 23, 2009 (JP) .................................. 2009-012454

(51) Int. Cl.
*G01J 5/02* (2006.01)
(52) U.S. Cl. .................................. 250/341.1; 250/341.8
(58) Field of Classification Search ............... 250/341.1, 250/341.8, 338.1
See application file for complete search history.

(56) References Cited

U.S. PATENT DOCUMENTS

| 5,952,818 A * | 9/1999 | Zhang et al. ..................... 324/96 |
| 2007/0282206 A1* | 12/2007 | Arnone et al. ................. 600/473 |
| 2008/0029712 A1* | 2/2008 | Canioni et al. ............. 250/474.1 |

FOREIGN PATENT DOCUMENTS

JP 2006-266908 A 10/2006

* cited by examiner

*Primary Examiner* — David P Porta
*Assistant Examiner* — Jessica L Eley
(74) *Attorney, Agent, or Firm* — Canon U.S.A., Inc. I.P. Division

(57) ABSTRACT

A measuring apparatus measures a time-domain waveform of THz wave pulse by time-domain spectroscopy. The apparatus includes a detector for detecting THz wave pulse containing a signal component at frequency fs, a small signal detector for detecting the signal component at frequency fs of a signal supplied from the detecting portion, with a time constant τ, and an integrator. The integrator is connected to an output stage of the small signal detector to integrate signals supplied from the small signal detector, and has a time constant below the time constant τ and over 1/(2fs).

6 Claims, 7 Drawing Sheets

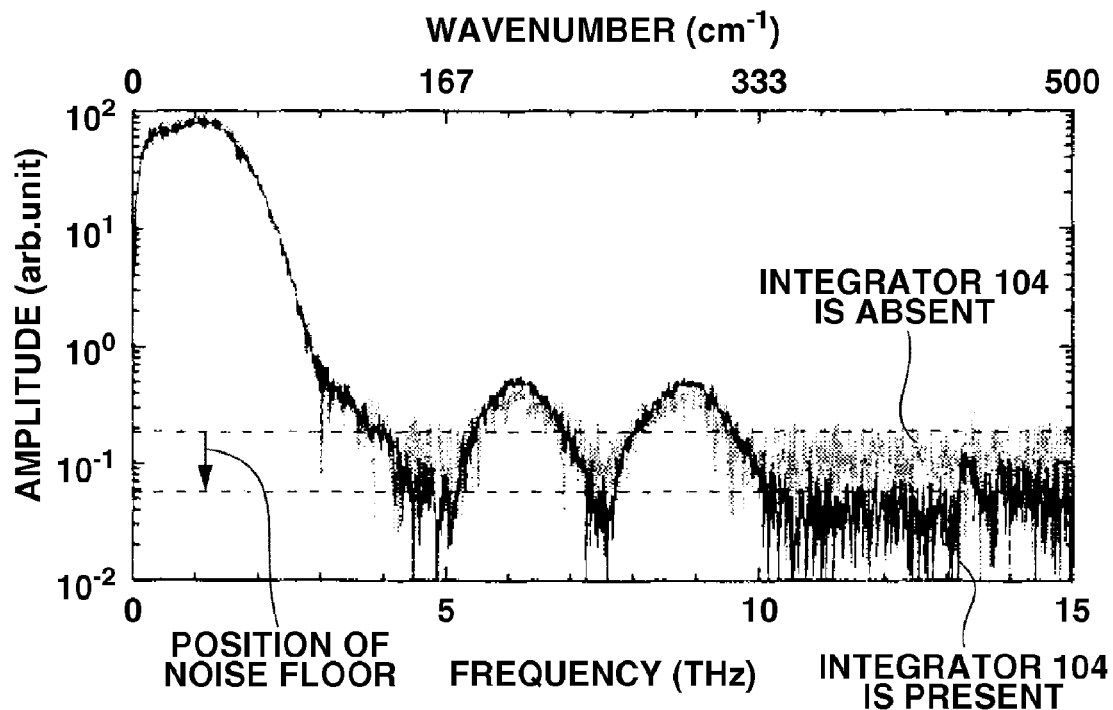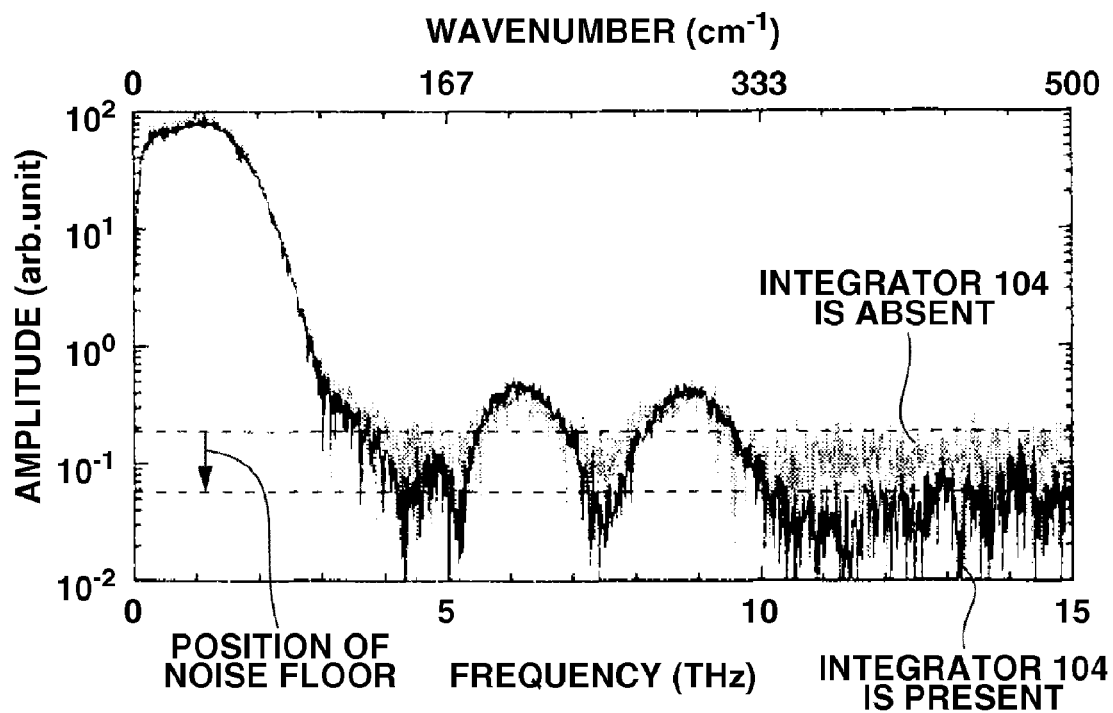

MEASURING APPARATUS USING TERAHERTZ WAVE

BACKGROUND OF THE INVENTION

1. Field of the Invention

The present invention relates to technology of measuring terahertz (THz) wave in time domain.

2. Description of the Related Art

THz wave is electromagnetic wave or radiation including a frequency component in a frequency range between 0.03 THz and 30 THz. THz-TDS (THz-Time Domain Spectroscopy) apparatus can acquire the intensity of instantaneous electric field of THz wave ultra-short pulse reaching a detector. This apparatus records a change in the instantaneous electric field intensity caused by changing time at which the ultra-short pulse reaches the detector, and acquires the time-domain waveform of THz wave. Since a signal intensity corresponding to the electric field intensity is very weak, the signal is acquired by using a small signal measuring device or detector such as a lock-in amplifier. Where signal detection is executed by the lock-in amplifier in the THz-TDS apparatus, THz wave is modulated at frequency fs so that the lock-in amplifier can detect a component at the frequency fs.

The signal thus detected is treated as the instantaneous electric field intensity of THz wave. At this time, the lock-in amplifier multiplies the signal of modulated electric field intensity with a reference signal at the frequency fs. The lock-in amplifier picks out a difference frequency component by a filter from derived components at sum frequency (2fs) and difference frequency (DC).

Regarding the signal measured by such a small signal measuring device, noise due to intensity variation of the ultra-short pulse and signals generated by the measuring system (i.e., thermal noise, noise specific to the system and the like) are superposed on the signal relevant to the above-described electric field intensity. Accordingly, where the time-domain waveform of THz wave is to be formed, each measurement data is liable to fluctuate about signals to be acquired, as illustrate in FIG. 7. Such signal fluctuation is a reason for raising a noise floor when the time-domain waveform of THz wave is converted into information in the frequency domain. Rise of the noise floor causes limitation to measurement band, so that suppression of unwanted signal components is desired.

To cope with the above issue, the following method has been proposed. In this method, plural time-domain waveforms of THz wave are summed, and arithmetic mean of the sum is calculated. Japanese Patent Laid-open No. 2006-266908 discloses a method in which arrival times of the ultra-short pulse at the detector are closely set to acquire a single time-domain waveform, and after plural time-domain waveforms are formed from the single time-domain waveform, the plural time-domain waveforms are subjected to arithmetic mean processing.

In the above method of obtaining the arithmetic mean from plural time-domain waveforms of THz wave, measurement time increases as times of measuring THz wave increases. Japanese Patent Laid-open No. 2006-266908 discloses a means for solving this issue. In this method, arrival timing of the ultra-short pulse at the detector is controlled by a mechanical stage. More specifically, a retro-reflective optical system (a delay optical system) is arranged on the mechanical stage to regulate an optical path through which the ultra-short pulse is transmitted. Intervals between measuring points constituting the time-domain waveform of THz wave correspond to the maximum frequency in the frequency domain. For example, where spectrum in a frequency domain of several tens THz is to be obtained, the mechanical stage is controlled with precision of several microns. When the time-domain waveform of THz wave is to be acquired, measurement is performed by moving the mechanical stage with this positioning precision over a range of several millimeters. Measurement time of THz wave mainly depends on this moving velocity of the delay optical system.

In the technology of Japanese Patent Laid-open No. 2006-266908, the mechanical stage is moved with very short intervals between measuring points. In such a case, the mechanical stage is to be moved with very fine positioning precision. Accordingly, where the time-domain waveform of THz wave is to be rapidly acquired, the mechanical stage needs to be moved at high speed over a long distance while maintaining the fine positioning precision. However, this is not easy to achieve.

Further, the lock-in amplifier has to have a time constant capable of responding to a signal change appearing when the mechanical stage is moved at high speed. More specifically, the time constant should be decreased. However, depending on the modulation frequency fs and the velocity of the mechanical stage, the time constant can come close to the sum frequency 2fs when the time constant is decreased. As a result, there occurs a fear that signals near the sum frequency component cannot be sufficiently attenuated, and the noise floor in the frequency domain may rise. For example, in FIG. 6B, the frequency characteristic of the small signal detecting portion depends on the above time constant, and sufficient attenuation of the sum frequency component (2fs) becomes difficult if this frequency characteristic approaches the 2fs component. Consequently, for example, as illustrated in FIG. 5B, fluctuation of the signal supplied from the small signal detecting portion increases, and the noise floor rises. This causes limitation to the measurement band of the frequency spectrum. This is an issue specific to the THz wave measurement, occurring where the time-domain waveform of THz wave is to be acquired at high speed by using the lock-in amplifier for obtaining a DC component. Namely, since the frequency spectrum is to be acquired, both high-speed measurement and signal stability are required.

As described in the foregoing, in the measurement of THz wave, reduction of noise floor and measuring time is desired.

SUMMARY OF THE INVENTION

According to one aspect of the present invention, there is provided a measuring apparatus for measuring the time-domain waveform of THz wave pulse by time-domain spectroscopy, which includes a detecting portion, a small signal detecting portion, and integrating portion. The detecting portion detects THz wave pulse containing a signal component at frequency fs. The small signal detecting portion has a time constant $\tau$, and detects the signal component at frequency fs of a signal supplied from the detecting portion. The integrating portion is connected to an output stage of the small signal detecting portion, and has a time constant below the time constant $\tau$ and over $1/(2fs)$.

According to another aspect of the present invention, there is provided a measuring method for measuring the time-domain waveform of THz wave pulse by time-domain spectroscopy, which includes a detecting step, a small signal detecting step, and an integrating step. In the detecting step, THz wave pulse containing a signal component at frequency fs is detected. In the small signal detecting step, the signal component at frequency fs of a signal detected in the detecting step is detected using a time constant $\tau$. In the integrating step, signals detected in the small signal detecting step are integrated or summed at a time constant below the time constant τ and over 1/(2fs).

According to the THz wave measuring apparatus and method of the present invention, signal components contributing to signal fluctuation of the time-domain waveform is attenuated by performing integration with the time constant below the time constant τ used in the small signal detection. Further, influence on time constant of the entire measuring system is decreased by performing integration with the time constant below the time constant τ. Thereby, without increasing the measuring time, the noise floor can be lowered and the measurement band can be widened.

Further features of the present invention will become apparent from the following description of exemplary embodiments with reference to the attached drawings.

BRIEF DESCRIPTION OF THE DRAWINGS

FIGS. 4A and 4B are graphs illustrating measurement examples obtained when the integrating portion is used.

DESCRIPTION OF THE EMBODIMENTS

Description will hereinafter be made of embodiments according to the present invention. An important point of an apparatus and method of the present invention is as follows. Time constant of integration executed subsequent to small signal detection for detecting a signal component at frequency fs by using a time constant τ is set below the time constant τ and over 1/(2fs). Thereby, signal components contributing to signal fluctuation of the time-domain waveform can be attenuated. Further, influence on time constant of the entire measuring system can be decreased. Moreover, frequency components over 2fs can be attenuated.

Based on this concept, fundamental embodiments of an apparatus and method of the present invention have the above-described constructions, respectively. On the basis of the fundamental embodiments, the following embodiments can be constructed.

A data arithmetic mean circuit connected to an output stage of the integrating portion can be further arranged. The data arithmetic mean circuit obtains an arithmetic mean per each data point forming the time-domain waveform (see FIG. 1B described below in detail). In this configuration, an output of the integration is divided into plural signals using circuits to obtain the arithmetic mean of the divided signals. As a result, suppression of thermal noise occurring randomly can be achieved, and the noise floor can be lowered.

Further, it is possible to acquire plural time-domain waveforms, and obtain an arithmetic mean of these waveforms. This configuration uses a rapid scan. In this method, the arithmetic mean of THz wave waveforms is obtained under condition in which the noise floor is lowered. Accordingly, compared with the conventional measuring method, measurement times necessary to obtain approximately the same SN (signal-to-noise) ratio can be reduced, and decrease in the measuring time can be facilitated.

Embodiments of the present invention will hereinafter be described with reference to the drawings.

Figure 1A:
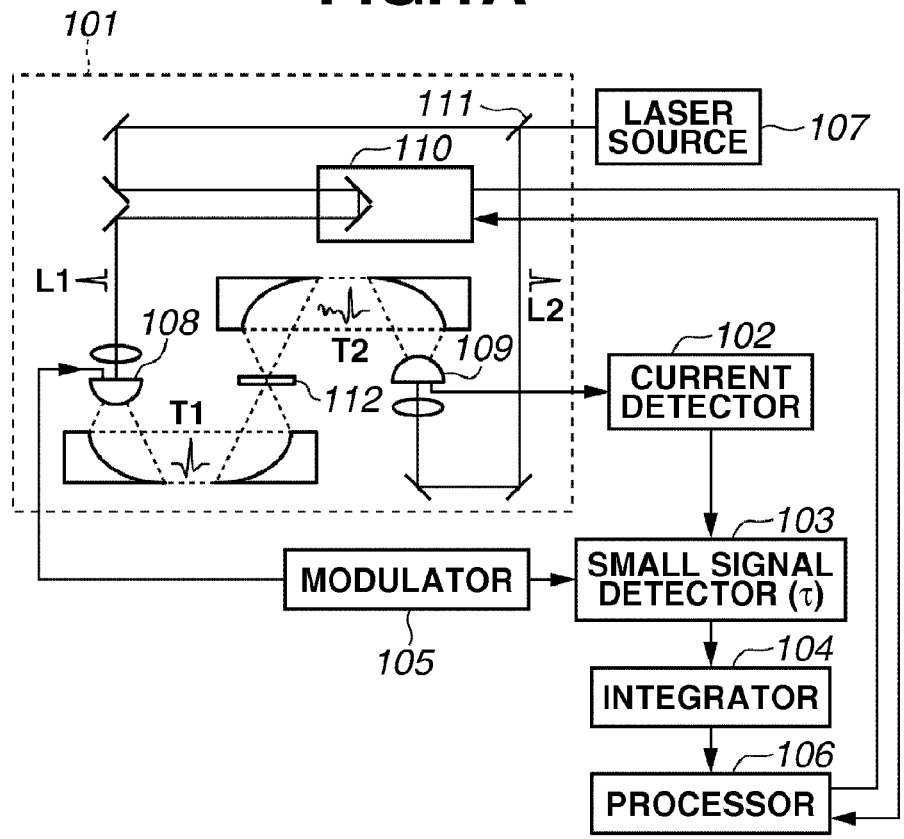
FIGS. 1A and 1B are views illustrating an embodiment of a measuring apparatus and method of the present invention.

FIG. 1A illustrates an embodiment of THz wave measuring apparatus and method. As illustrated in FIG. 1A, the THz wave measuring apparatus is mainly comprised of a measuring portion 101 for measuring the intensity of instantaneous electric field of THz wave, and a portion for obtaining the time-domain waveform of THz wave pulse from an output signal supplied from the measuring portion 101. The measuring portion 101 includes a generating portion 108, a detecting portion 109, and a delay optical portion 110. The portion for obtaining the time-domain waveform includes a current detecting portion 102, a small signal detecting portion 103, an integrating portion 104, and a processing portion 106.

The measuring portion 101 will be described. The generating portion 108 generates THz wave pulses. The generating portion 108 generates THz wave by employing instantaneous current, or inter-band transition of carriers (i.e., employing a gain structure), for example. The instantaneous current employing method includes a method of irradiating a polished mirror surface of semiconductor or a surface of organic crystal with laser light to generate THz wave. Further, there is a method in which electric field is applied to a photoconductive device wherein metal electrodes with an antenna pattern are formed on a semiconductor thin film, and the field-applied portion is irradiated with laser light. PIN diode can also be used to generate THz wave. As the method of employing the gain structure, there is a method of using a semiconductor quantum well structure.

The detecting portion 109 detects the electric field intensity of THz wave pulse. The detecting portion 109 can use the following detecting methods. The field intensity can be detected by detecting photo-current that occurs due to photo-conduction proportionally with the electric field intensity. The field intensity can also be detected by using electro-optic effect. The field intensity can be detected by detecting magnetic field using magneto-optic effect. Photoconductive device can be used in the method of detecting the photo-current. Orthogonal polarizer and electro-optic crystal can be used in the method of using the electro-optic effect. Orthogonal polarizer and magneto-optic crystal can be used in the method of using the magneto-optic effect.

The generating portion 108 and the detecting portion 109 operate when carriers are excited by ultra-short pulse laser light from a laser source 107, respectively. As illustrated in FIG. 1A, the ultra-short pulse laser light is divided into two light L1 and L2 by a beam splitter 111. The ultra-short pulse laser light L1 is guided to the generating portion 108 through a delay optical portion 110. The ultra-short pulse laser light L2 is guided to the detecting portion 109.

The delay optical portion 110 regulates a position on the time axis of the time-domain waveform of THz wave that is to be sampled by the detecting portion 109. More specifically, the delay optical portion 110 regulates or delays incident time of the laser light L2 on the detecting portion 109 relative to incident time of the laser light L1 on the generating portion 108. The delay time can be regulated by directly regulating the optical path length, or regulating the effective optical path length. In the direct regulating method, retro-reflective optical system and movable portion can be used, as illustrated in FIG. 1A. In the effective regulating method, the effective optical path length can be regulated by changing refractive index of a portion in the path of laser light.

The portion for forming the time-domain waveform of THz wave pulse will be described. The current detecting portion 102 amplifies small current from the detecting portion 109 to a level capable of being measured. Where the detecting portion 109 supplies small voltage, the current detecting portion 102 can be replaced by a portion for amplifying voltage.

The small signal detecting portion 103 detects an aimed signal from signals buried in noise, as a lock-in amplifier does. Where the lock-in amplifier is used as the small signal detecting portion 103, a reference signal at modulation frequency fs is input thereinto from a modulating portion 105. At this time, the modulating portion 105 also modulates THz wave generated by the generating portion 108 at the modulation frequency fs. The detecting portion 109 supplies the signal containing the component at the modulation frequency fs to the small signal detecting portion 103. The small signal detecting portion 103 includes a low pass filter (LPF) with a time constant $\tau$, and outputs a signal component at a difference frequency between frequencies of the signal from the current detecting portion 102 and the reference signal.

Figure 7:
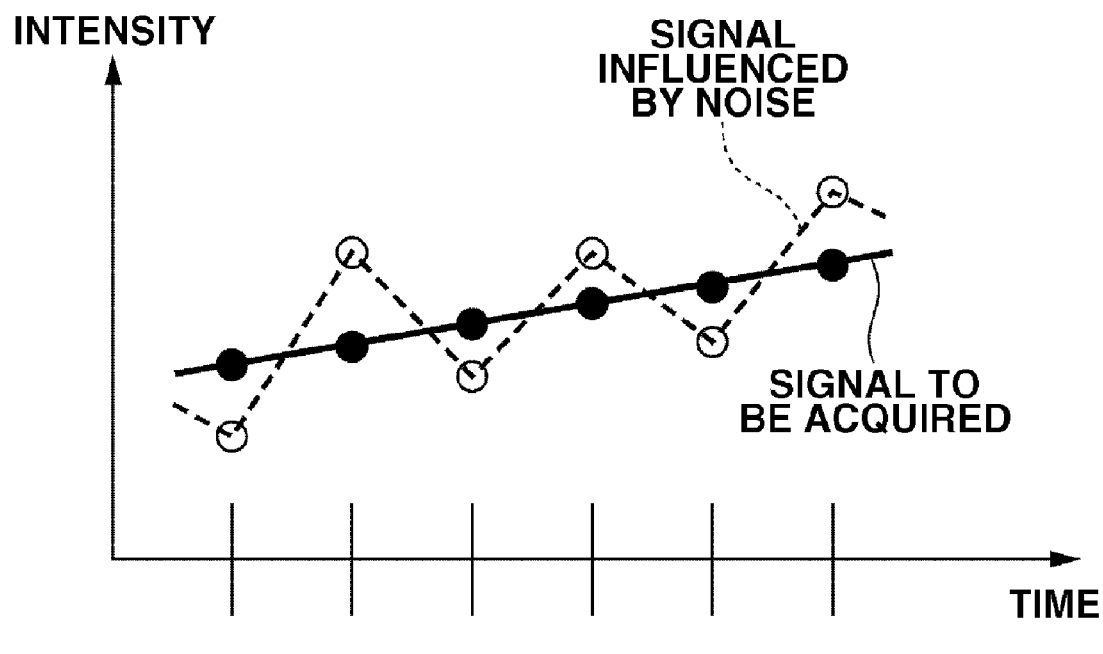
FIG. 7 is a graph illustrating the issue in a conventional measuring method.

The processing portion 106 regulates the delay time controlled by the delay optical portion 110. The processing portion 106 refers to the regulation amount of the delay optical portion 110 and a signal corresponding to instantaneous electric field intensity of THz wave at this regulated position to form the time-domain waveform of THz wave. FIG. 7 illustrates a manner of forming the time-domain waveform. When the delay time between laser light incident on the generating portion 108 and laser light incident on the detecting portion 109 reaches a value set by the processing portion 106 through the operation of the delay optical portion 110, the processing portion 106 records a signal corresponding to the electric field intensity of THz wave at this moment. In FIG. 7, the delay time is indicated by $\Delta t$. The processing portion 106 performs this operation every $\Delta t$ to form the time-domain waveform. The signal corresponding to the electric field intensity of THz wave is mainly supplied from the small signal detecting portion 103. As described above, the small signal detecting portion 103 has its characteristic time constant $\tau$. The time constant $\tau$ is set below $\Delta t$ because measurement data obtained with intervals of $\Delta t$ is desirably independent from each other.

Where a spectrum in a region of the THz wave frequency is to be acquired, the processing portion 106 Fourier-transforms the time-domain waveform to provide spectral information. Where the take-in time interval is $\Delta t$, the maximum frequency of reproducible spectrum can be represented by $1/(2\Delta t)$.

The above structure is a typical one of the THz-TDS apparatus. In addition thereto, the measuring apparatus of present invention further includes the integrating portion 104 arranged between the small signal detecting portion 103 and the processing portion 106.

The integrating portion 104 integrates signals supplied from the small signal detecting portion 103. The integrating portion 104 has a given attenuation slope in at least a portion of its frequency characteristic. The integrating portion 104 integrates signals at frequencies in the attenuation slope (this is also called an integrating region). Thus, since the integrating portion 104 has the attenuation slope, a time constant exists in the integrating portion 104. It is unfavorable that the operation of the THz-TDS apparatus is influenced by the time constant of the integrating portion 104. Therefore, the time constant of the integrating portion 104 is set below $\tau$. The integrating portion 104 suppresses fluctuation of signals of the small signal detecting portion 103, as illustrated in FIG. 7. Thereby, when the time-domain waveform of THz wave is converted into information in the frequency domain, the noise floor can be lowered, and the measurement band of the frequency spectrum can be widened.

Figure 2A:
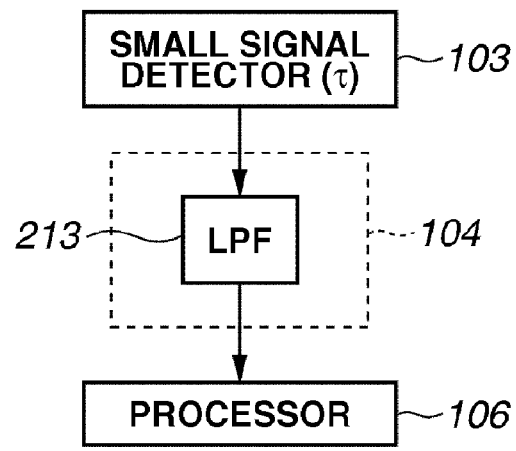
FIGS. 2A and 2B are views illustrating an integrating portion.
Figure 2B:
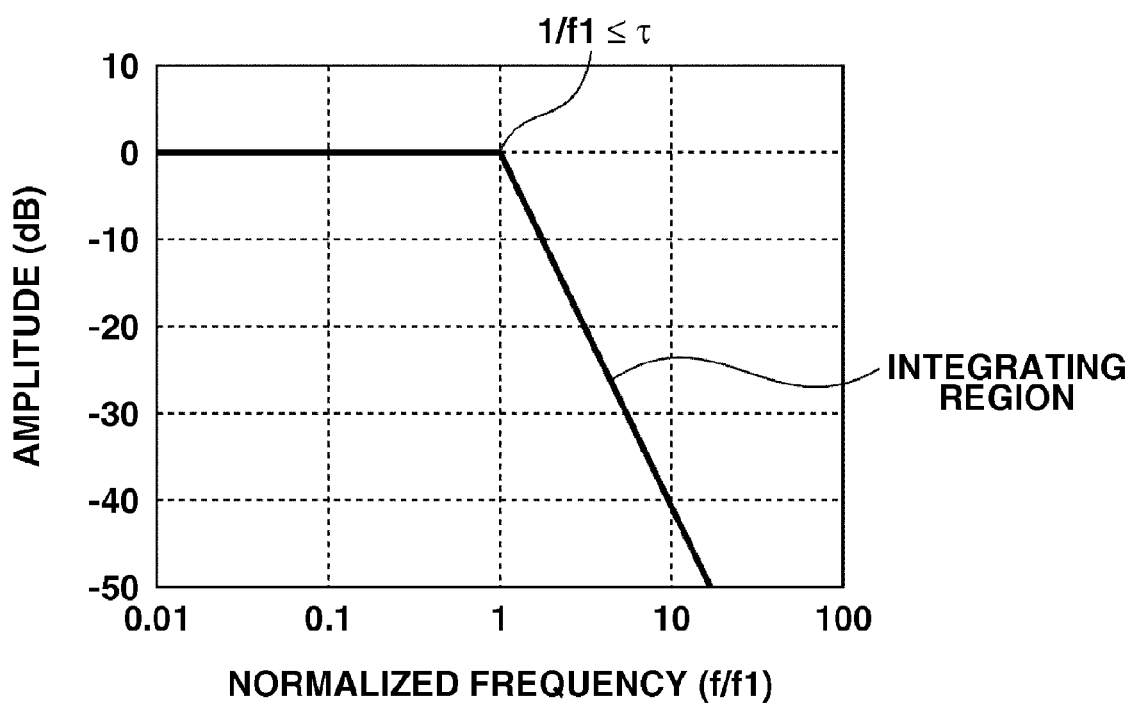

The integrating portion 104 can have a partial integrating region, or an entire integrating region. The former can use a low pass filter. FIG. 2A illustrates this configuration. FIG. 2B illustrates the frequency characteristic of this integrating portion 104. Here, the integrating portion 104 includes a low pass filter 213. In FIG. 2B, normalization of the frequency axis is performed with frequency f1 whereat the integrating region starts. As described above, the time constant $1/f1$ of the integrating portion 104 is set below the time constant $\tau$ of the small signal detecting portion 103 to suppress influence on the operation of the THz-TDS apparatus. The low pass filter 213 is clearly discriminated from the low pass filter in the small signal detecting portion 103 in the frequency characteristic.

Figure 3A:
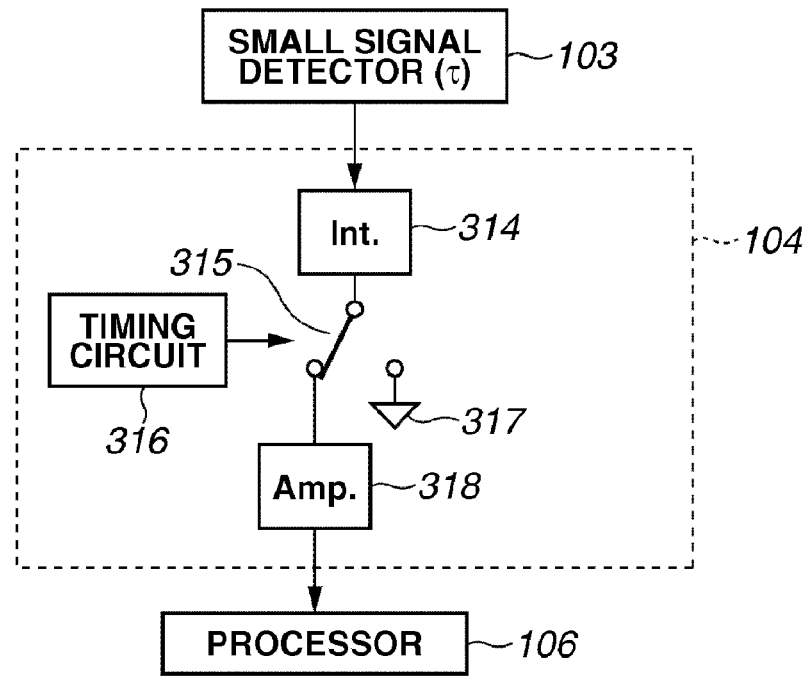
FIGS. 3A and 3B are views illustrating another integrating portion.
Figure 3B:
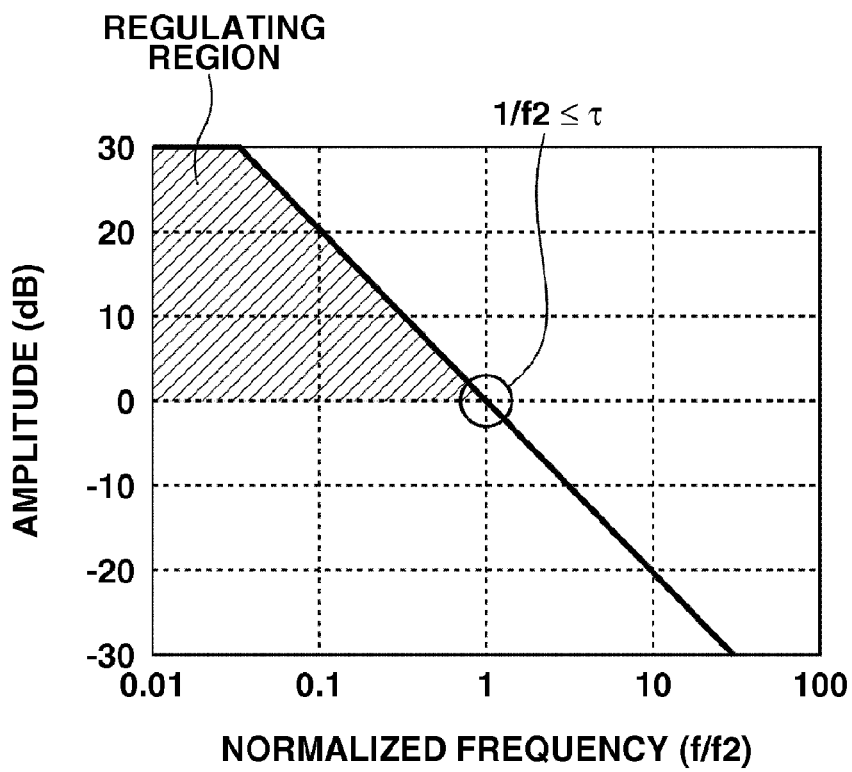

The integrating portion 104 with the entire integrating region can be a complete integrating circuit using a capacitor. FIG. 3A illustrates this configuration. FIG. 3B illustrates the frequency characteristic of this integrating portion 104. This integrating portion 104 includes an integrating circuit 314, a switch circuit 315, a timing circuit 316, a ground 317, and a regulating circuit 318. The integrating circuit 314 is a complete integrating circuit comprised of the capacitor. This circuit has the integrating region staring at frequency near DC, as illustrated in FIG. 3B. Thus, the integrating circuit 314 can integrate all frequency components. The switch circuit 315 can selectively connect the integrating circuit 314 to the regulating circuit 318 or the ground 317. When the switch circuit 315 selects connection to the regulating circuit 318, integration is started and charge is accumulated in the integrating circuit 314. The integrated result is supplied to the regulating circuit 318. When the switch circuit 315 selects connection to the ground 317, charge in the integrating circuit 314 is discharged to the ground 317 and integration is stopped. The timing circuit 316 regulates intervals with which the connecting selection is changed.

This interval is synchronized with the interval at which the signal is taken in the processing portion 106. More specifically, upon acquisition of signal by the processing portion 106, integration is stopped, and integration is started after the integrating circuit 314 discharges charge. The regulating circuit 318 regulates the amplifying factor. Since the integrating circuit 314 is the complete integrating circuit, amplification of component increases as its frequency approaches DC, as illustrated in FIG. 3B. Output of the integrating circuit 314 is regulated so that signals in the regulating region wherein the amplifying factor is over one (1) can be prevented from exceeding a measurable range of the processing portion 106 and its saturation can be prevented. Thus, this integrating circuit 104 performs integration by a unit time. In the frequency axis of FIG. 3B, normalization is performed with frequency f2 at which the regulating region ends. As described above, the time constant $1/f2$ of the integrating portion 104 is set below the time constant $\tau$ of the small signal detecting portion 103 to suppress influence on the operation of the THz-TDS apparatus. The integrating portion 104 illustrated in FIG. 3A can flexibly set the integrating range.

Figure 1B:
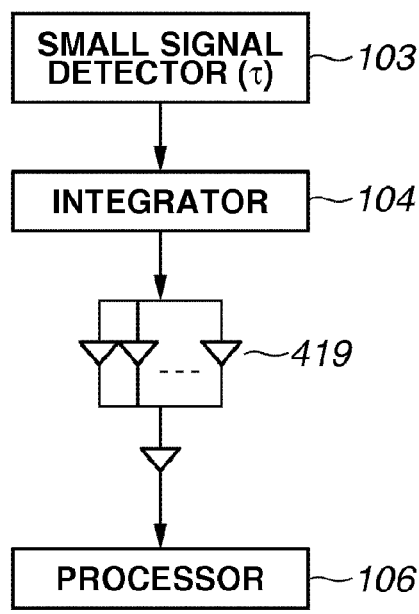

Further, as illustrated in FIG. 1B, N-stage circuit 419 for obtaining an arithmetic mean can be provided between the integrating portion 104 and the processing portion 106. The N-stage circuit 419 can be comprised of N adding circuits and a circuit for taking N-average of outputs from the adding circuits. In the N-stage circuit 419, the output of the integrating portion 104 is divided into N signals, and the signals are added and then averaged. Thereby, thermal noise randomly generated in the circuit is reduced by 1/√N. The noise floor can be improved by insertion of the N-stage arithmetic mean circuit.

Operation of the THz wave measuring apparatus of this embodiment will be described. Here, each of the generating portion 108 and the detecting portion 109 includes a generally-used photoconductive device.

The laser source 107 outputs ultra-short pulse laser light, and the laser light is divided into L1 and L2 by the beam splitter 111. The laser light L1 is guided to the generating portion 108 through the delay optical portion 110. The laser light L2 is guided to the detecting portion 109.

The processing portion 106 regulates the delay time between the laser light L1 and L2 using the delay optical portion 110 to measure an initial measuring point (for example, the first measuring point in FIG. 7). Upon the ultra-short pulse laser light L1 reaching the generating portion 108, the generating portion 108 emits THz wave T1. This THz wave T1 is modulated by the modulating portion 105. For example, the modulation frequency fs is 10 kHz.

THz wave T1 is condensed onto a sample 112, and THz wave T2 transmits through the sample 112. In FIG. 1A, though THz wave transmits through the sample 112, THz wave can be reflected by the sample 112. Here, THz wave T1 is condensed onto the sample 112, but parallel light can impinge on the sample 112.

THz wave T2 from the sample 112 is scattered and absorbed due to characteristics of the sample 112, so that it is a signal containing information of characteristics of the sample 112. THz wave T2 then reaches the detecting portion 109. The detecting portion 109 outputs signal corresponding to the intensity of instantaneous electric field of THz wave T2 incident on the detecting portion 109 at the time the ultra-short pulse laser L2 reaches the detecting portion 109. Where the detecting portion 109 uses the photoconductive device, the detecting portion 109 outputs a current signal.

Figure 5A:
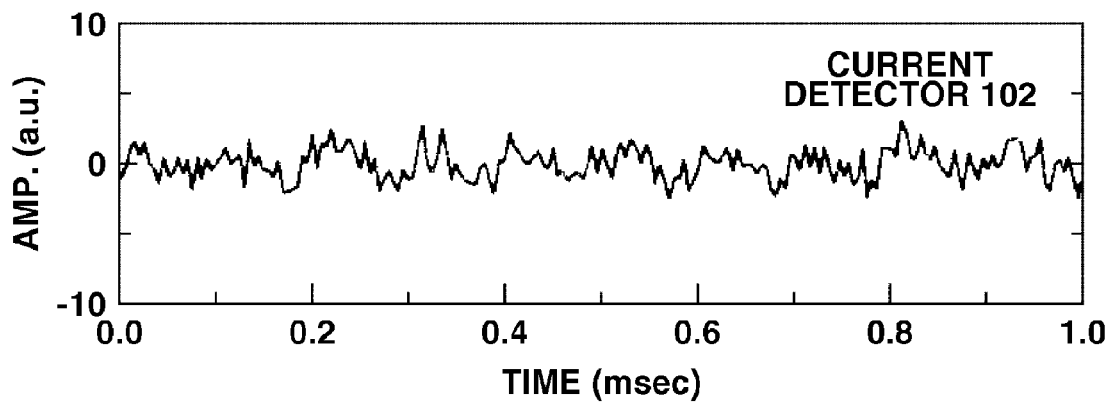
FIGS. 5A to 5C are graphs illustrating effect in the time domain obtained when the integrating portion is used.
Figure 6A:
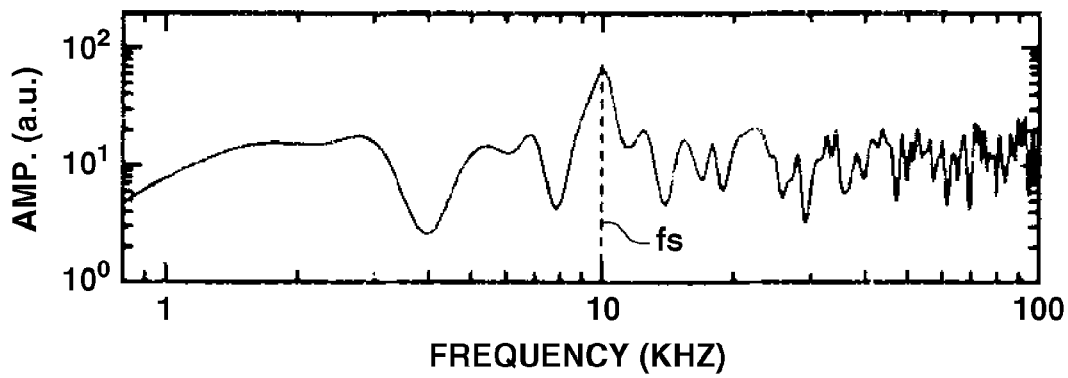
FIGS. 6A to 6C are graphs illustrating effect in the frequency domain obtained when the integrating portion is used.

The current signal output from the detecting portion 109 is converted into a voltage signal by the current detecting portion 102, and amplified to a level capable of being measured. As far as the delay time regulated by the delay optical portion 110 is maintained unchanged, the position of instantaneous electric field intensity of THz wave T2 sampled by the laser light L2 is identical. Therefore, the signal output from the current detecting portion 102 is a signal approximately similar to DC. In this embodiment, however, intensity of THz wave T1 is modulated by the modulating portion 105. Accordingly, as illustrated in FIG. 5A, intensity-modulated DC signal is output from the current detecting portion 102. FIG. 6A illustrates frequency information of the signal from the current detecting portion 102. As illustrated therein, the signal output from the current detecting portion 102 has a strong signal component at the modulation frequency fs.

As illustrated in FIG. 5A, the signal from the current detecting portion 102 contains signal components at frequencies other than the frequency fs. Therefore, its SN ratio is low. For this reason, the small signal detecting portion 103 extracts the component at the modulation frequency fs from the signal of the current detecting portion 102.

Figure 6B:
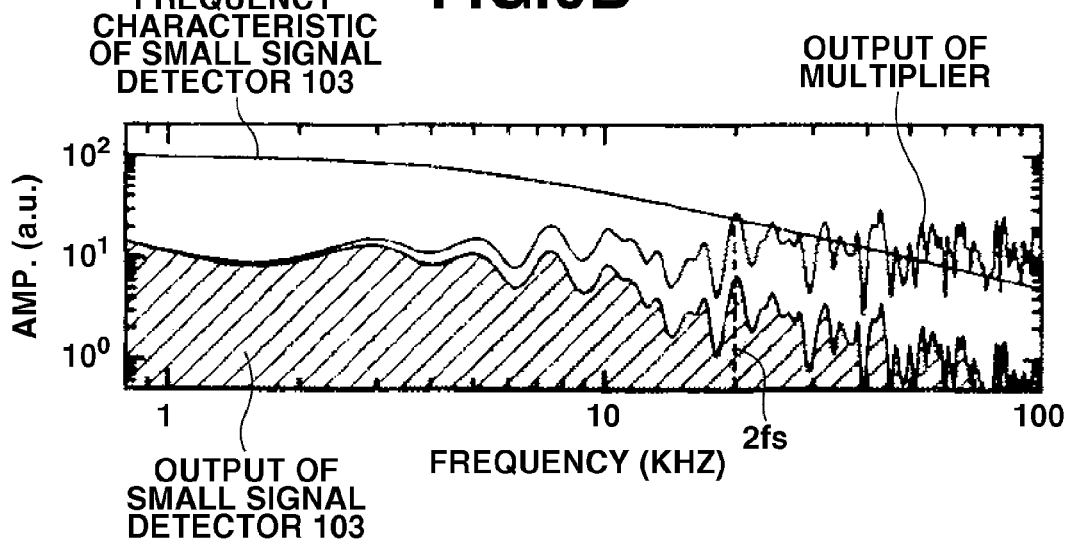

FIG. 6B illustrates the frequency characteristic of the small signal detecting portion 103. Where the small signal detecting portion 103 uses the lock-in amplifier, the small signal detecting portion 103 includes a multiplying portion for multiplying signals of the current detecting portion 102 and the modulating portion 105, and a filtering portion for filtering an output from the multiplying portion to attenuate unnecessary signal components. FIG. 6B illustrates the output from the multiplying portion. As illustrated therein, this output contains frequency component at 2fs, DC component, and noise components. In the output from the multiplying portion, components at frequencies near the modulation frequency fs appear on a DC side, and components (mainly noise components) at frequencies apart from the modulation frequency fs appear on a high frequency side.

The filtering portion in the small signal detecting portion 103 extracts signals near the DC component from the output of the multiplying portion. The filtering portion is comprised of a low pass filter with the time constant τ. The time constant τ corresponds to a cutoff frequency of the low pass filter. The time constant τ is a factor that limits the frequency characteristic of the small signal detecting portion 103. FIG. 6B illustrates the frequency characteristic of the small signal detecting portion 103. As illustrated in FIG. 6B, signal components of the output of the small signal detecting portion on the high frequency side are attenuated in accordance with the frequency characteristic. This fact is illustrated by a hatched portion in FIG. 6B.

Figure 5B:
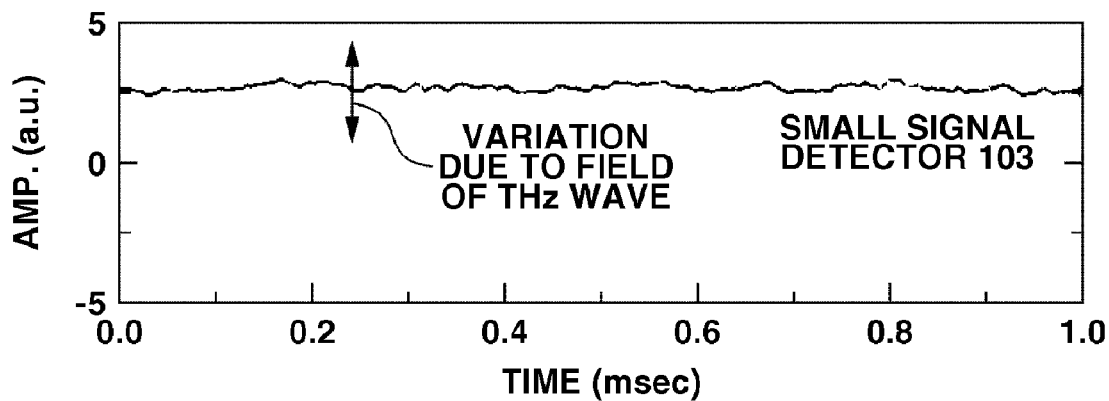

FIG. 5B illustrates output of the time-domain waveform from the small signal detecting portion 103. As illustrated in FIG. 5B, the DC component is extracted. The DC component corresponds to instantaneous electric field of THz wave. When the regulation amount of the delay optical portion 110 is changed, a value of the DC component varies. The varying velocity depends on the frequency characteristic of the small signal detecting portion 103 illustrated in FIG. 6B. For example, where the varying velocity is to be increased, the time constant τ of the small signal detecting portion 103 is decreased. In terms of the frequency domain, cutoff frequency is increased. When the varying velocity is increased, the time-domain waveform of THz wave can be rapidly acquired. However, as the time constant τ decreases, frequency components at frequencies above the sum frequency 2fs cannot be sufficiently attenuated. Thus, the SN ratio of the time-domain waveform illustrated in FIG. 5B is lowered.

Figure 6C:
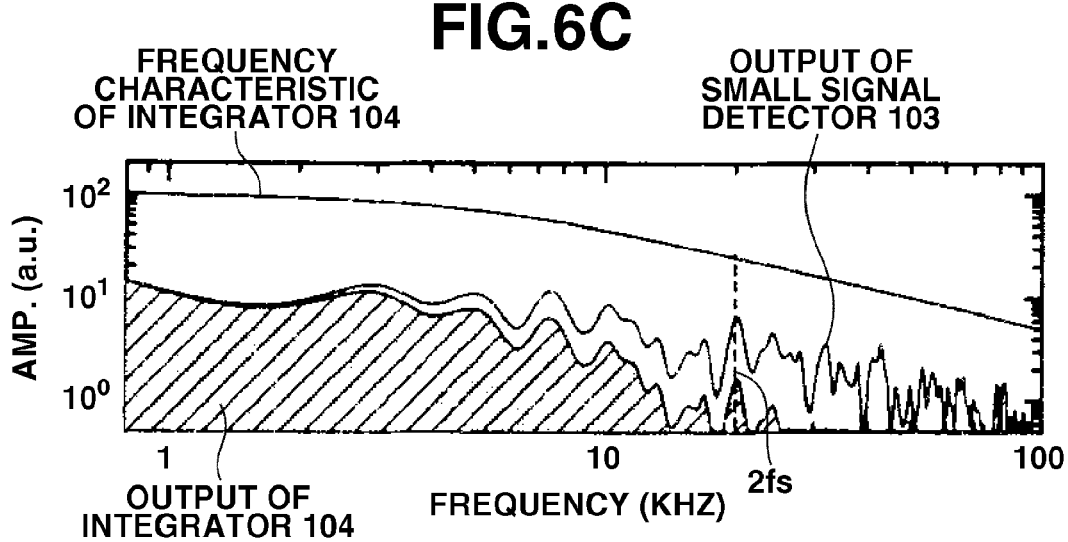

In the present invention, decrease in the SN ratio resulting from rapid acquisition of THz wave is compensated by the action of the integrating portion 104. As illustrated in FIG. 1A, output of the small signal detecting portion 103 is supplied to the integrating portion 104. FIG. 6C illustrates the frequency characteristic of the integrating portion 104. Here, the integrating portion 104 is comprised of the low pass filter. With respect to the frequency characteristic of the integrating portion 104, the time constant of the integrating portion 104 is set below the time constant τ of the small signal detecting portion 103 to suppress influence on the operation of the measuring system. And, as described above, it is necessary for the integrating portion 104 to attenuate components at frequencies above the sum frequency 2fs that are not sufficiently attenuated by the small signal detecting portion 103. Therefore, the time constant of the integrating portion 104 is set above 1/(2fs). Here, the time constant of the integrating portion 104 is set equal to the time constant τ of the small signal detecting portion 103.

Figure 5C:
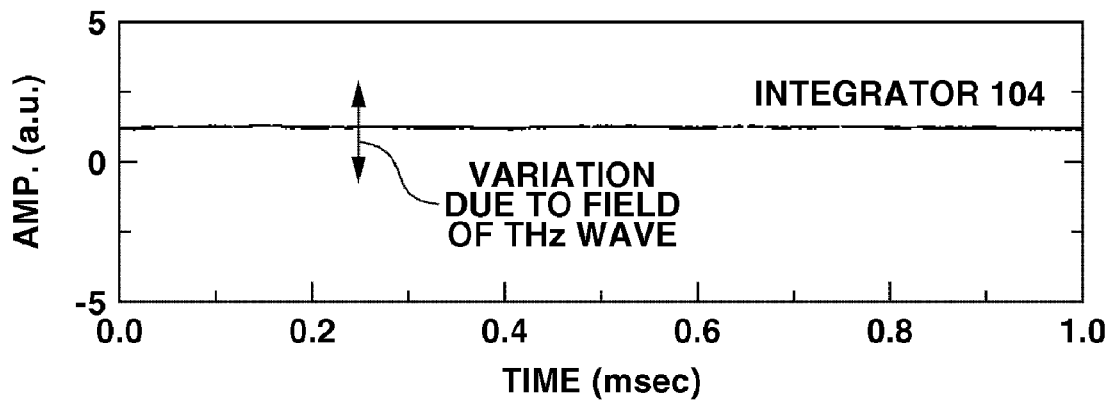

As illustrated in FIG. 6C, components at frequencies above the sum frequency 2fs of output from the small signal detecting portion 102 are attenuated in accordance with the frequency characteristic of the integrating portion 104. This result is illustrated by a hatched portion in FIG. 6C. As a result, the SN ratio of output from the integrating portion 104 is improved as compared with output from the small signal detecting portion 102. The output from the integrating portion 104 becomes closer to DC, as illustrated in FIG. 5C.

The processing portion 106 records the output from the integrating portion 104. The processing portion 106 repetitively controls the delay optical portion 110 to regulate the delay time between ultra-short pulse laser light L1 and L2. Thus, measuring point is successively measured. Such a series of operations is repeated, and the processing portion 106 forms the time-domain waveform of THz wave transmitted through the sample 112. The time-domain waveform of THz wave can be Fourier-transformed to obtain its frequency spectrum. When this frequency spectrum is compared with frequency spectrum obtained without any sample, transmittance of the sample 112 can be calculated. When plural time-domain waveforms of THz wave are acquired plural times and arithmetic mean thereof is obtained, the SN ratio can be further improved. This is a rapid scan method.

As described in the foregoing, in this embodiment, decrease in SN ratio (i.e., rise of the noise floor) resulting from reduction of time for acquisition of THz wave is compensated for. Thus, it is possible to achieve both of high-speed acquisition of THz wave and reduction of the noise floor.

More specific embodiments will be described. A first specific embodiment relates to a measuring system. Description of a portion thereof common to the above embodiment is omitted. In this first specific embodiment, each of the generating portion 108 and the detecting portion 109 includes a photoconductive device with antenna formed on low-temperature-grown gallium nitride (LT-GaAs) layer. The antenna is a dipole antenna with antenna length of 30 microns and a gap of 5 microns at its center. The laser source 107 is a titanium sapphire laser having pulse width of 50 femtoseconds, center wavelength of 800 nm, and repetitive frequency of 76 MHz. The delay optical portion 110 is a retro-reflective optical system, and regulates the optical path length of ultra-short pulse laser L1 by a unit of 3 microns. Intensity of ultra-short pulse laser light L1 and L2 is 5 mW.

In this specific embodiment, no sample is inserted, and a free space is present therefor. The modulating portion 105 supplies a square wave with peak-to-peak voltage of 20 Vpp and frequency of 1 kHz to the generating portion 108. The modulating portion 105 supplies a TTL (transistor-transistor-logic) signal with the same frequency of 1 kHz to the small signal detecting portion 103. Atmosphere in the measuring portion 101 is replaced by nitrogen gas. Measurement temperature is set at 24 degrees centigrade, and humidity is set below 3 percent.

The current detecting portion 102 is a current-to-voltage converting circuit with converting efficiency of $10^7$ V/A. The small signal detecting portion 103 is a lock-in amplifier with sensitivity of 100 mV and time constant of 30 milliseconds. The integrating portion 104 is a low pass filter with time constant of 3 milliseconds.

The processing portion 106 forms a time-domain waveform by performing measurement at 4000 points, and measurement is once executed. Frequency spectrum of THz wave is illustrated in FIG. 4A. FIG. 4A illustrates measurement result obtained by the conventional measuring system without integrating portion, and measurement result of this specific embodiment. As illustrated in FIG. 4A, the noise floor is lowered and band of the frequency spectrum is widened by the integrating portion 104. In terms of effect attained by a method wherein arithmetic mean processing of the waveform is performed, a falling ratio of the noise floor corresponds to a value obtained by a case where measurement of time-domain waveform is performed ten (10) times and arithmetic mean thereof is calculated. As a result, measurement band is widened by about 0.5 THz.

Thus, improvement of the noise floor is achieved by the integrating portion 104. It is accordingly possible to reduce times of measurement of the time-domain waveform necessary for acquisition with approximately the same SN ratio as the conventional measuring method. Thereby, reduction of the measuring time can be facilitated.

A second specific embodiment will be described. This specific embodiment relates to another measuring system. In this embodiment, the integrating portion 104 is a low pass filter with time constant of 10 milliseconds.

FIG. 4B illustrates the frequency spectrum of THz wave obtainable when this integrating portion 104 is used. FIG. 4B illustrates measurement result obtained by the conventional measuring system without integrating portion, and measurement result of this second specific embodiment. Also in the second specific embodiment, the noise floor is lowered and band of the frequency spectrum is widened by the presence of the integrating portion 104. In terms of effect attained by the arithmetic mean processing method of the waveform, a falling ratio of the noise floor corresponds to a value obtainable by the case where measurement of time-domain waveform is performed ten (10) times and arithmetic mean thereof is calculated. As a result, measurement band is widened by about 0.5 THz.

Thus, also in this embodiment, improvement of the noise floor can be achieved by using the integrating portion 104. It is hence possible to reduce times of measurement of the time-domain waveform necessary for acquisition with approximately the same SN ratio as the conventional measuring method. Reduction of the measuring time can also be facilitated.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-012454, filed Jan. 23, 2009, which is hereby incorporated by reference herein in its entirety.

What is claimed is:

1. A measuring apparatus for measuring a time-domain waveform of THz wave pulse by time-domain spectroscopy, the apparatus comprising:
    a detector configured to detect THz wave pulse containing a signal component at frequency fs;
    a small signal detector configured to have a time constant τ, and detect the signal component at frequency fs of a signal supplied from the detector; and
    an integrator configured to be connected to an output stage of the small signal detector to integrate signals supplied from the small signal detector, and have a time constant below the time constant τ and over 1/(2fs).

2. The measuring apparatus according to claim 1, further comprising a data arithmetic mean circuit configured to be connected to an output stage of the integrator, and obtain an arithmetic mean per each data point of the time-domain waveform.

3. The measuring apparatus according to claim 1, wherein the integrator has frequency characteristic with a partial integrating region, or with an entire integrating region.

4. A measuring method to be performed in a measuring apparatus for measuring a time-domain waveform of THz wave pulse by time-domain spectroscopy, the method comprising:

a detecting step of detecting, via a detector, THz wave pulse containing a signal component at frequency fs;

a small signal detecting step of detecting, via a small signal detector, the signal component at frequency fs of a signal detected by the detector in the detecting step, with a time constant $\tau$; and an integrating step of integrating, via an integrator, signals detected in the small signal detecting step via the small signal detector, with a time constant below the time constant $\tau$ and over $1/(2fs)$.

5. The measuring method according to claim 4, further comprising a data arithmetic mean step of obtaining, via an arithmetic mean circuit, an arithmetic mean per each data point of the time-domain waveform.

6. The measuring method according to claim 4, further comprising a waveform arithmetic mean step of acquiring a plurality of time-domain waveforms to obtain an arithmetic mean of the time-domain waveforms.

* * * * *